June 8, 1926.

F. W. LUNDY

PISTON RING

Filed Dec. 5, 1925

1,587,970

INVENTOR.
Fred W Lundy
BY
ATTORNEY.

Patented June 8, 1926.

1,587,970

UNITED STATES PATENT OFFICE.

FRED W. LUNDY, OF DENVER, COLORADO.

PISTON RING.

Application filed December 5, 1925. Serial No. 73,403.

This invention relates to improvements in the construction of piston rings of the type employed in connection with internal combustion engines.

It is well known to owners of automobiles and others who employ internal combustion engines that one of the biggest difficulties experienced in connection with their operation is that the connection between the piston and the inside of the cylinder becomes worn to such an extent that oil will pass from the crank casing into the combustion chamber in sufficiently large quantities to foul the spark plugs and deposit carbon on the upper end of the piston. All of which produces an unsatisfactory operation of the engine and besides increases the expense of lubrication. The oil usually enters the combustion chamber by passing between the piston rings and the grooves in the piston or between the piston ring and the inner surface of the cylinder. When the rings are new and tight, very little oil can pass, but as the piston rings wear and as the clearance between the piston rings and the piston ring grooves increases the pumping of the oil also increases.

In order to obviate the difficulty above pointed out, a large variety of piston rings have been invented and patented, some of which have found wide application and other of which seem to have met with no general demand.

It is not my intention to describe the prior art as this is too extensive but I shall devote this specification to a description of the particular ring invented by me and which has been designed for the specific purpose of obtaining a good oil tight seal which will not deteriorate as the rings wear, but which will remain tight as long as the rings are in reasonably good condition.

My invention briefly described consists in forming each ring of two expansible members having conical meeting faces, one or both of said members being recessed so as to form a sharp edge that will scrape the oil downwardly and thereby prevent the film from passing from the lower to the upper side of the ring. The lower part of the composite ring is provided with several openings which permit the oil to pass into the space between the ring and the bottom of the piston ring groove from whence the oil returns to the crank case through an opening in the piston.

Having now briefly described my invention and the object sought to be attained thereby, I will now proceed to describe the construction in detail, reference for this purpose being had to the accompanying drawing in which.

Figure 1:
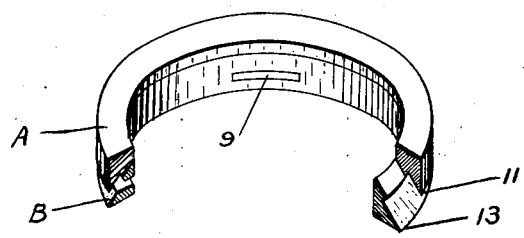
Fig. 1 shows a perspective view of a segment of the composite ring.
Figure 2:
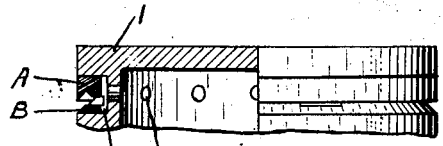
Fig. 2 is a side elevation with parts thereof shown in section of the upper end of a piston and the piston ring.
Figure 3:
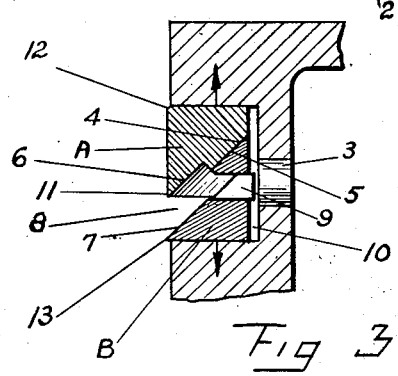
Fig. 3 is a section similar to that shown in Figure 2, but to a larger scale.
Figure 4:
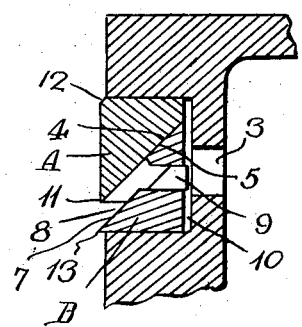
Fig. 4 is a section similar to that shown in Fig. 3, but illustrating a modification in which the oil groove is cut entirely in one of the ring sections.

In the drawing reference numeral 1 represents a piston of ordinary construction and numeral 2 indicates one of the piston ring grooves of which every piston has from two to four or more. Openings 3 extend from the bottom of the piston ring groove to the interior of the piston. Located within the groove is one of my composite rings comprising two sections "A" and "B". These sections have conical meeting faces 4 and 5 which extend at an angle of substantially forty-five degrees with a stem passing perpendicularly through the axes of the piston. The upper ring section "A" has an inner cut out portion indicated by numeral 6 and the upper surface of section "B" has a portion 7 cut therefrom so as to form with the corresponding cut in section "A" an annular conical groove indicated by numeral 8 in Figure 3. Holes 9 extend through the ring section "B" and open into the space 10 between the inner surface of the piston ring and the bottom of the piston ring groove. Since both sections "A" and "B" are expansible and tend to expand to a somewhat greater diameter than the inside of the cylinder with whose surface they cooperate, there will always exist a force tending to spread the rings apart in the direction of the arrows shown in Figure 3. It will be noted that the peripheral surface of the lower ring section that contacts with the cylinder wall is small in comparison with the corresponding surface of the upper ring section. For this reason the lower ring section will wear faster than the upper and this permits it to expand more, thereby producing a force that tends to widen the composite ring so as to compensate for wear. This force causes the upper and lower surfaces of the rings to fit tighter against the corresponding sides of the piston ring groove so as to form a tight joint between these adjacent surfaces. Where a ring is made of one piece, the wear to which it is subjected soon spoils the fit between the ring and the sides of the piston ring groove whereby a leakage of oil is permitted. This is obviated in the construction shown in Figure 3. It will be noted that the lower outer edge 11 of the section "A" is sharp and any wear on the outer periphery of this section merely tends to sharpen this edge. It is evident that when the piston travels downwardly within the cylinder, the sharp edge 11 will scrape the oil film from the surface of the cylinder. The oil that is thus accumulated will collect in the annular recess 8 and passes inwardly through the holes 9 to the chamber 10 and from thence through the openings 3 into the interior of the piston. Sufficient oil will remain in recess for lubrication. The upper corner 12 of the ring section "A" can be made rectangular in the manner shown or can be chamfered so that it will tend to slide over the oil film when the piston moves in an upward direction. The lower outer edge 13 of the section "B" is of the same peripheral diameter as the outside of section "A" and is usually brought to a sharp edge whereby it will wear faster than "B".

It will be apparent from the above description that when a piston is supplied with one or more piston rings of the type shown and described that oil will pass from the crank case into the combustion chamber only with great difficulty. It will also be evident that a ring constructed in this manner has the properties of compensating for wear so that the sealing properties will not be adversely affected by wear of the piston rings or the sides of the piston ring groove.

Although I have shown and described the annular recess or groove 8 as formed by having a part cut from each ring section, I want it understood that this groove may be formed entirely in the lower section or may be formed entirely in the upper section just so that an oil groove is formed about the ring and in communication with the openings.

Having now described my invention, what I claim as new is:

1. A piston packing comprising, in combination, a piston having a piston ring groove, a composite packing ring in said groove, said ring comprising upper and lower sections having conical meeting faces, the conical faces of both sections being cut away near their outer peripheries so as to form an annular channel the lower section having openings from the channel to the inner surface thereof.

2. A piston packing comprising upper and lower expansible ring sections having conical meeting faces, said composite ring being provided with an annular recess which extends inwardly from the outer periphery thereof and which forms an oil collecting channel, each of the expansible sections having substantially the same peripheral diameter, said lower section having openings extending from the oil channel to the interior thereof.

3. A piston packing comprising an upper and a lower expansible ring section each of which has a conical meeting face which is adapted to cooperate with a similar face on the other, the outer periphery of one of said sections being cut away along the meeting faces so as to form an oil collecting groove, the lower section having openings which connect the oil groove with the rear thereof.

4. A piston packing comprising an upper and a lower expansible ring section, each of which has a conical meeting surface dapted to cooperate with the meeting face on the other, the cross sectional area of each section being substantially the same, said sections having portions along the meeting faces cut away so as to form a conical oil receiving groove the lower section having openings from the groove to the rear thereof.

In testimony whereof I affix my signature.

FRED W. LUNDY.